United States Patent [19]

McKeon et al.

[11] Patent Number: 5,045,693

[45] Date of Patent: Sep. 3, 1991

[54] CARBON/OXYGEN WELL LOGGING METHOD AND APPARATUS

[75] Inventors: Donald C. McKeon, Houston; Bradley A. Roscoe, Pasadena; Christian Stoller, Kingwood, all of Tex.

[73] Assignee: Schlumberger Technology Corporation, Houston, Tex.

[21] Appl. No.: 514,915

[22] Filed: Apr. 26, 1990

Related U.S. Application Data

[63] Continuation of Ser. No. 401,579, Aug. 24, 1989, Pat. No. 4,937,446, which is a continuation of Ser. No. 203,397, Jun. 7, 1988, abandoned.

[51] Int. Cl.$^5$ .............................................. G01V 5/10
[52] U.S. Cl. .................................... 250/270; 250/265; 250/266; 250/267
[58] Field of Search .................. 250/265, 266, 267, 270

[56] References Cited

U.S. PATENT DOCUMENTS

| | | | |
|---|---|---|---|
| 2,991,364 | 7/1961 | Goodman | 250/262 |
| 3,223,839 | 12/1965 | Martin et al. | 250/265 |
| 3,321,625 | 5/1967 | Wahl | 250/268 |
| 3,508,058 | 4/1970 | Frentrop | 376/118 |
| 3,521,064 | 7/1970 | Moran et al. | 250/261 |
| 3,562,526 | 2/1971 | Lawson | 250/266 |
| 3,775,216 | 11/1973 | Frentrop | 156/293 |
| 3,849,646 | 11/1974 | McKinlay et al. | 250/270 |
| 4,232,220 | 11/1980 | Hertzog | 250/270 |
| 4,317,993 | 3/1982 | Hertzog, Jr. et al. | 250/270 |
| 4,380,701 | 4/1983 | Smith, Jr. et al. | 250/266 |
| 4,409,481 | 10/1983 | Smith, Jr. et al. | 250/270 |
| 4,501,964 | 2/1985 | Arnold | 250/270 |
| 4,507,554 | 3/1985 | Hertzog et al. | 250/270 |
| 4,645,926 | 2/1987 | Randall | 250/256 |
| 4,661,700 | 4/1987 | Holeka | 250/267 |
| 4,721,853 | 1/1988 | Wraight | 250/269 |
| 4,883,956 | 11/1989 | Melcher et al. | 250/269 |

FOREIGN PATENT DOCUMENTS

| | | | |
|---|---|---|---|
| 0188878 | 7/1986 | European Pat. Off. | 250/266 |
| 0206593 | 12/1986 | European Pat. Off. | |
| 2012419 | 7/1979 | United Kingdom | |

Primary Examiner—Constantine Hannaher
Attorney, Agent, or Firm—Henry N. Garrana; Frederic C. Wagret

[57] ABSTRACT

A nuclear spectroscopic method and apparatus for determining hydrocarbon saturation or water saturation of a formation adjacent a well bore is disclosed. Near and far inelastic gamma ray spectra are detected in response to pulses of fast neutrons irradiating the formation and materials in the borehole. Near and far carbon/oxygen (C/O) ratios are extracted from each spectra using predetermined spectra of postulated elements. The near and far C/O ratios are combined to determine a representation of formation hydrocarbon saturation substantially corrected for borehole gamma rays produced by inelastic reaction of fast neutrons and hydrocarbons in the well bore. Shielding of near and far detectors is provided to make the near detector more sensitive to gamma rays emanating from borehole gamma rays and to make the far detector less sensitive to borehole gamma rays and more sensitive to formation gamma rays.

8 Claims, 8 Drawing Sheets

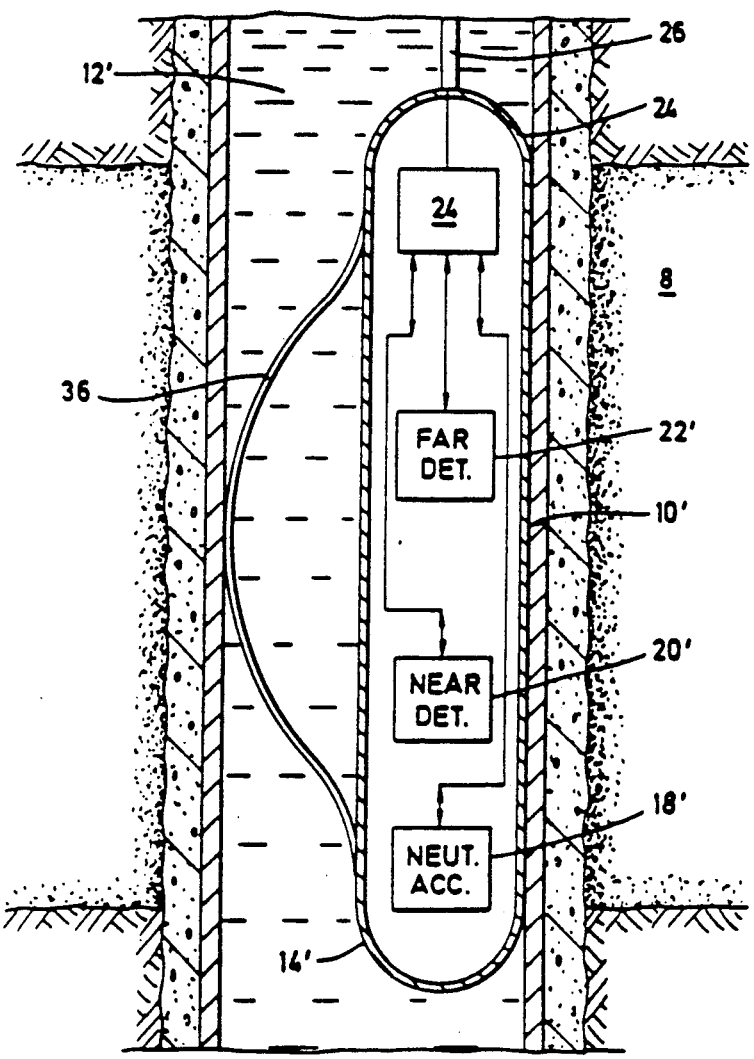
FIG. 2
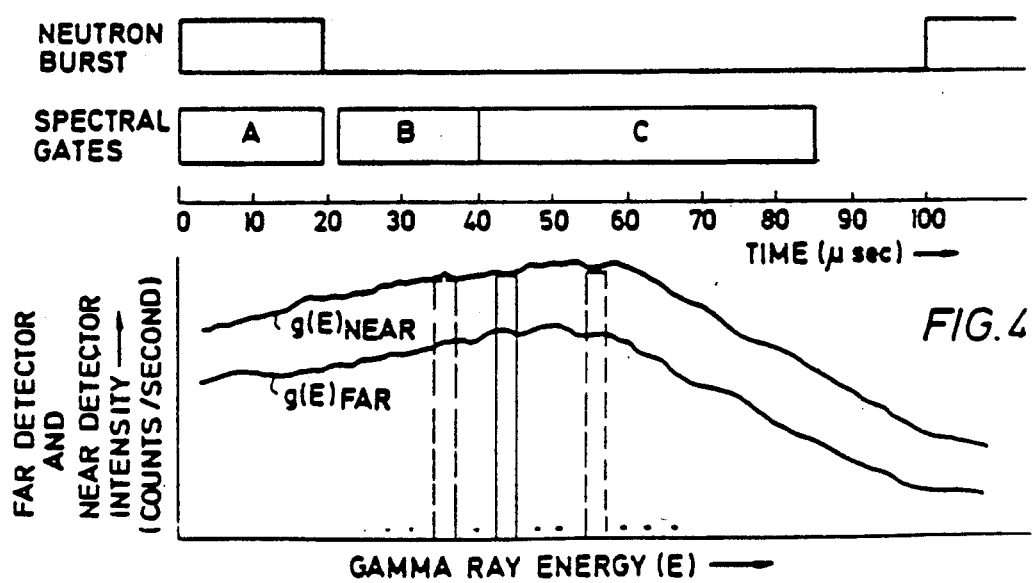
FIG. 3
FIG. 4

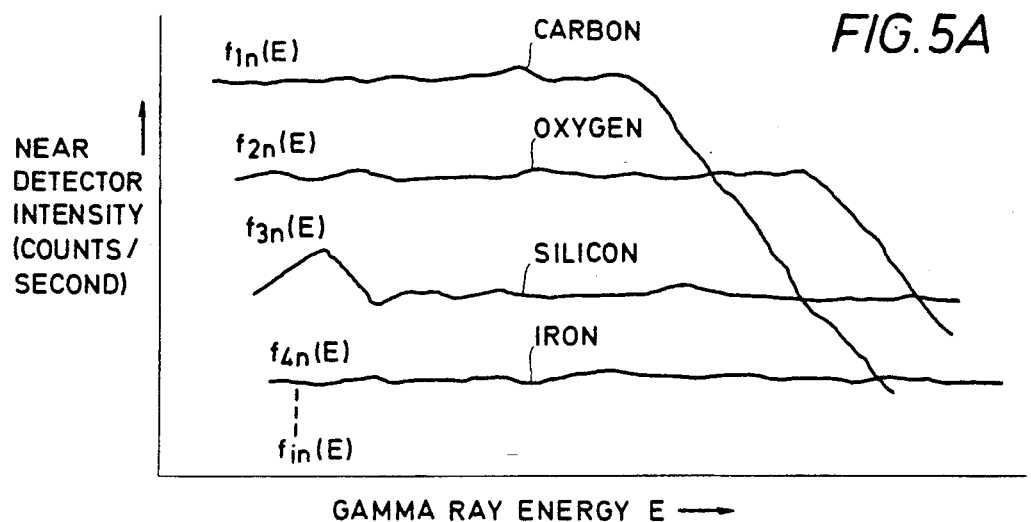
FIG.5A
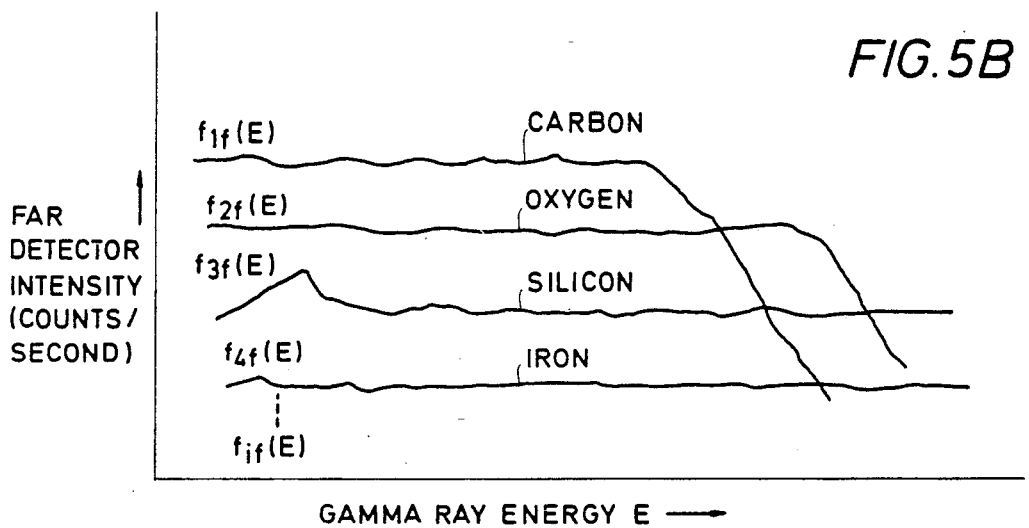
FIG.5B
FIG.5C
| ASSUMPTION |
|---|
| KNOWN LITHOLOGY |
| KNOWN BOREHOLE SIZE |
| KNOWN CASING SIZE |
| KNOWN POROSITY |
| KNOWN LOGGING TOOL |

CARBON/OXYGEN WELL LOGGING METHOD AND APPARATUS

This is a division of Ser. No. 07/401,579 filed Aug. 24, 1989, which is a continuation of Ser. No. 07/203,397 filed June 7, 1988 now abandoned, now U.S. Pat. No. 4,937,446, issued Jun. 26, 1990.

BACKGROUND OF THE INVENTION

1. Field of the Invention

This invention relates to nuclear well logging apparatus and methods for determining the nature of fluids in formations through which a well bore is formed. More particularly, the invention relates to determining the hydrocarbon saturation (or its correlative, water saturation) of formations adjacent a well bore by nuclear radiation logging. Still more particularly, the invention relates to inelastic gamma ray spectrum logging of a formation with correction for gamma rays from borehole fluids.

2. Description of Prior Art

A major goal of well logging is to establish the fraction of pore space occupied by hydrocarbons. Three methods of doing so have been developed in the prior art. Electrical resistivity and thermal neutron decay methods measure the water saturation $S_w$, and the difference, $S_o = 1 - S_w$ is then the saturation of all other liquids and gases. (The term $S_o$, or "oil" saturation will be used hereafter to refer not only to liquid hydrocarbons, but also to gaseous hydrocarbons). Both the electrical resistivity and thermal neutron decay methods depend upon the presence of salts dissolved in the water and for that reason are less effective in fresh water than in salt water environments.

Because hydrocarbons contain carbon and water contains oxygen, methods and apparatus have been developed for detecting carbon and oxygen and other elements with a logging sonde. When a high energy ("fast") neutron is scattered inelastically from carbon, a 4.438 MeV gamma ray is emitted; when a neutron is scattered from oxygen, a 6.1 MeV gamma ray is emitted. Therefore, logging apparatus which counts the number of 4.438 MeV gamma rays and the number of 6.1 MeV gamma rays and determines their ratio should be under ideal conditions, a measure of the ratio of carbon to oxygen in the formation. Such measurements are known in the art as carbon/oxygen or simply, C/O measurements or C/O logs. Moreover, a calcium/silicon ratio can also be obtained. Comparison of the two ratios permits the user to distinguish carbon in calcium carbonates from that in hydrocarbons.

In cased hole wells, where the salinity or salt content of a water-saturated zone is not known, is very low, or has been altered by production by water injection, the C/O measurement is the only alternative to resistivity and neutron decay methods.

Under actual field conditions, however, the well bore may contain hydrocarbons (in the form of oil or gas) and water. Consequently, C/O measurements of the formation are contaminated or "corrupted" with gamma rays resulting from the collision of fast neutrons with carbon and oxygen atoms of fluids in the borehole. In addition, clays of certain earth formations contain carbon atoms. Such contamination of the inelastic gamma ray spectral data, and ultimately of the $S_o$ determination, may be eliminated if the porosity, lithology, borehole configuration and hydrocarbon content of the fluid in the well bore is known with precision.

Characteristics as a function of depth of a cased well, such as porosity and lithology of the formation and the borehole configuration may be known. But C/O logging has been highly sensitive to uncertainty of the borehole oil/water mixture. For this reason C/O logging measurements of cased, producing wells have required that the well be "shut-in" so that the borehole fluid components may be known better. However, even with shut-in wells, the content of borehole fluid is not always known well enough.

U.S. Pat. No. 4,507,554 issued Mar. 26, 1985 to Hertzog and Nelligan describes a nuclear logging method by which a pulsed neutron source and a single detector comprising a scintillation crystal and a photomultiplier tube are used to detect spectra of signals resulting from a neutron pulse. An inelastic spectrum, an early capture spectrum and a later capture spectrum are measured. The early capture and late capture spectra are compared to derive a representation of the spectral composition of the borehole contents. The inelastic spectra having gamma ray counts of borehole and formation fluids and matrix, is corrected using the desired spectrum of the borehole contents.

U.S. Pat. No. 4,645,926 issued Feb. 24, 1987, to Randall describes a nuclear logging system and apparatus having a pulsed neutron source and near and far detectors. Count rate data are accumulated over a plurality of discrete intervals covering the entire interval during and between bursts of the neutron source to obtain both inelastic and capture portions of the detected gamma rays. An example of the use of the inelastic portion of the spectrum is to generate parameters highly sensitive to changes of the borehole, because of the shallow depth of investigation available from the inelastic radiation. The borehole conditions most evidenced by such parameters are those related to changes in the geometry of the borehole. A ratio of total counts of near detector inelastic gamma rays is used as an indicator of changes in the borehole for diagnosing system irregularities and as an indicator of borehole effects on other parameters.

While the technology of the patents described above represent efforts to advance the nuclear logging art, there has remained the need for a method and apparatus by which the oil saturation $S_o$ of a formation may be accurately determined through C/O logging techniques with correction for corrupting gamma rays of unknown amounts of hydrocarbons in the borehole. Consequently, several objects of the invention have been identified.

IDENTIFICATION OF THE OBJECTS OF THE INVENTION

A principal object of this invention is to provide near and far detectors in a C/O logging system by which carbon and oxygen determinations from spectra measured at both detectors may be combined to produce a representation of oil saturation of the formation corrected for the gamma rays produced by carbon and oxygen atoms in the borehole.

It is another object of this invention to simultaneously determine carbon and oxygen concentrations from inelastic spectra from near and far detectors in response to fast neutron pulses of a nuclear logging system.

Another object of this invention is to provide shielding structure such that the sensitivity of the near detector to borehole generated gamma rays is enhanced.

Another object of this invention is to provide shielding structure such that the sensitivity of the far detector to borehole generated gamma rays is abated while its reception of formation gamma rays is enhanced.

SUMMARY OF THE INVENTION

The objects identified above and other advantages and features of the invention are incorporated in a method and apparatus for determining the hydrocarbon saturation of a formation traversed by a well bore in which a logging sonde adapted for translation in the well bore is equipped with a pulsed neutron source and near and far detectors. The detectors are scintillation crystal-photomultiplier assemblies. Spectral electronics are provided for producing measured inelastic spectra signals for both near and far detectors. Standard near and far spectra of postulated constituents are used to determine from the near and far inelastic spectra signals representative of carbon and oxygen as measured from each detector. The carbon and oxygen measured representations of the near detector and the carbon and oxygen representations of the far detector are combined in a predetermined borehole/formation sensitivity matrix to produce a signal representative of formation $S_o$ corrected for borehole effects.

In order to increase the sensitivity of the near detector to borehole gamma rays, shielding and orientation of the near detector in the sonde are provided for the near detector to enhance near detector reception of gamma rays emanating from the borehole. The sensitivity of the far detector to borehole gamma rays is abated with other shielding and orientation of the far detector in the sonde while simultaneously enhancing its reception of gamma rays emanating from the formation.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which:

FIG. 2 is a schematic illustration of a larger diameter through tubing version of a well logging tool according to the invention and further showing the means by which the tool may be eccentered against the well casing after the tool has reached a depth below the bottom of the tubing;

FIG. 3 illustrates timing schedules for neutron bursts and counting gates which are used in the measurement of the invention;

FIG. 4 is an illustration of gamma ray count spectra obtained by near and far detectors of the downhole tool;

FIGS. 5A and 5B are respective illustrations of predetermined postulated constituent spectra for respective near and far detectors of the downhole tool, and FIG. 5C illustrates the assumptions for combining the near and far detector yield outputs;

DESCRIPTION OF THE INVENTION

Figure 1:
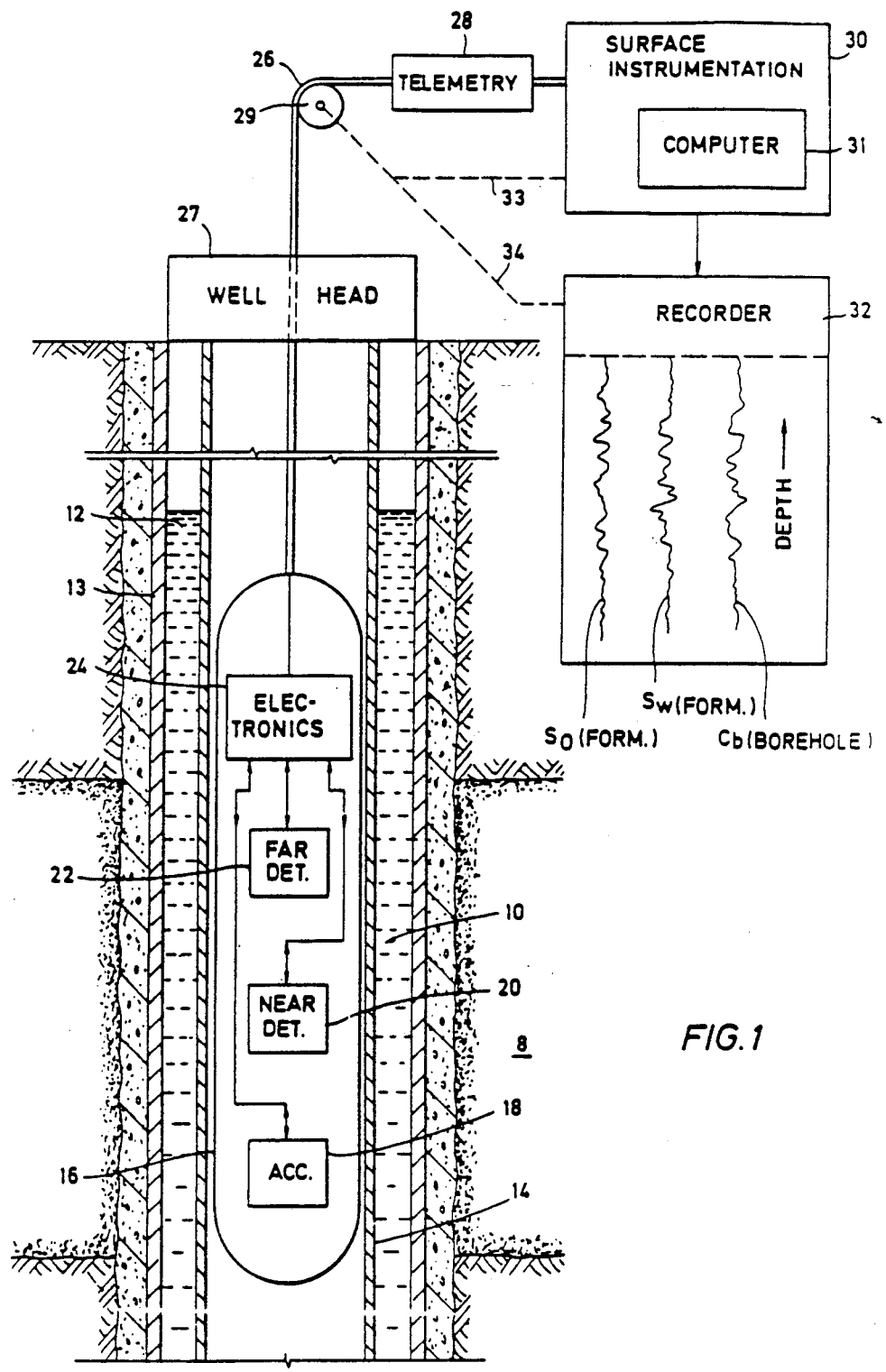
FIG. 1 is a schematic illustration of a through tubing version of a well logging tool within a well bore in communication with surface instrumentation including a computer.

FIG. 1 schematically illustrates logging sonde 10 in a well bore 12 during logging operations. The sonde 10 includes a housing 16 in the shape of a cylindrical sleeve, which, for running through small diameter production tubing, may be 1-11/16 inches (about 4.3 centimeters) in outside diameter. Although not illustrated in FIG. 1, the small diameter sonde 10 may also have the eccentering device, like that shown in FIG. 2, for forcing the tool against well casing beneath the bottom end of tubing 14. Accelerator or pulsed neutron source 18 is mounted in the sonde with near detector 20 and far detector 22 mounted longitudinally (axially) above accelerator 18 with increasing axial distances. Acquisition, control and telemetry electronics 24 are shown schematically and will be described in more detail below. Electronics 24 serves to control the timing of burst cycles of the neutron accelerator 18, the timing of detection time gates for near and far detectors 20, 22, and to telemeter count rate and other data via cable 26 and telemetry circuitry 28 to surface instrumentation 30 which includes computer 31. Computer 31 receives gamma ray spectral data from near and far detectors 20, 22 and processes and combines it according to the method of this invention to produce a signal representative of formation hydrocarbon (hereafter simply "oil") saturation $S_o$. The signal may be recorded as a function of depth on recorder 32 along with a signal representative of the percentage of oil in the borehole fluid, $C_b$. Water saturation $S_w$ may also be recorded.

The schematic illustration of FIG. 1 shows application of the invention through tubing 14 in the well bore 12 which typically is lined with steel casing 13 and cemented (not shown) in place through formations 8. Well head 27 at the earth's surface communicates with tubing 14. Sheave wheel 29 is shown schematically as controlling the movement of sonde 10 through tubing 14. The depth of the sonde 10 within well bore 12 is measured by encoders associated with sheave 29 as indicated by dotted lines 33, 34 from sheave 29 to computer 31 and recorder 32.

FIG. 2 illustrates an alternative sonde 10' disposed in a well bore 12' which may be an open hole but is more likely a case hole beneath production tubing as illustrated. Sonde 10 includes an eccentering device such as bow spring 36 forcing housing 14' against the wall of the casing or bore of the well bore. The through tubing sonde 10', like the through tubing sonde 10 of FIG. 1, has a neutron accelerator 18' and progressively spaced apart near and far detectors 20', 22'. The outside diameter of sonde 10' is preferably 2½ inches (about 6.35 centimeters). The method of processing the near and far inelastic spectral data is described first and is then followed by a description of the system and apparatus provided to implement the method.

Method for Processing Spectral Data to Determine Oil Saturation of the Formation Compensated for Oil in the Borehole As will be discussed in more detail concerning implementation of the apparatus of FIG. 1, the accelerator is operated to provide a burst of fast neutrons periodically as illustrated in FIG. 3. In the preferred embodiment of the invention, 20 μsec neutron bursts occur in a 100 μsec cycle time. Gate A, substantially coinciding with the neutron burst, is used to detect inelastic gamma rays produced by the fast neutrons, while other gates B and C indicated in FIG. 3, may be used to detect gamma rays produced as the neutrons slow down to thermal energy and are captured by the nuclei of elements.

FIG. 4 depicts the inelastic energy spectra of gamma ray counts as detected by near and far detectors 20 and 22 during gate A of the repetition burst-detection cycle. The inelastic energy spectra (and capture spectra from gates B and C) are obtained by accumulating the gate counts-per-channel signals from near and far detectors for a period long enough to give a statistically satisfactory spectrum, e.g., on the order of 20 seconds for the timing sequence of FIG. 3. This is done under control of surface instrumentation 30 to output spectra as depicted for example in FIG. 4. The surface instrumentation 30 is then recycled to zero, and new channel count data for spectra for a new depth in the well bore 12 are accumulated.

Two gamma ray count functions, $g(E)_{near}$ and $g(E)_{far}$ are obtained at each depth of the borehole of sonde 16 from surface instrumentation 30 after receipt of gamma ray count and pulse height information from circuitry 24. The method of the invention includes determining for each detector measured amounts of elements of the formation and borehole from a composite spectrum made up of weighted standard spectra of the constituents postulated to comprise the formation and the borehole. As described in U.S. Pat. No. 3,521,064 issued July 21, 1970 to Moran and Tittman, the weights for the standard spectra which give the best fit of the composite spectrum to the unknown spectrum represent the relative proportions of the constituents in the formation and borehole. By appropriate selection of the standards, the proportions of the constituents of interest, such as carbon, oxygen, silicon, calcium, iron, etc., can be obtained.

The 100 μsec repetition rate illustrated in FIG. 3 is set high to enhance the statistical accuracy of the inelastic scattering gamma ray spectra. But closely spaced neutron bursts have the disadvantage that background gamma rays, resulting in this instance predominantly from thermal neutron capture reactions between formation constituents and neutrons from one or more preceding bursts, will be present during the detection periods for the inelastic scattering gamma rays. Such capture gamma rays will of course be sensed by the near and far detectors and unless compensated for, will tend to degrade the inelastic scattering gamma ray spectra.

The counts detected by the near detector 20 and the far detector 22 in spectral gate B of FIG. 3 may be used according to the teachings of U.S. Pat. No. 4,232,220 to correct the inelastic spectra detected in gate A for capture background gamma rays. According to U.S. Pat. No. 4,232,220 issued in the name of Russel C. Hertzog and assigned to the assignee of this invention and application, background spectra for both near and far spectra may be subtracted from the inelastic spectra detected in gate A resulting in new inelastic spectra corrected for background effects. U.S. Pat. No. 4,232,220 is incorporated herein for its disclosure of correcting inelastic spectra with spectra derived from gates immediately following the neutron burst.

Alternatively, the counts detected by the near detector 20 and the far detector 22 in spectral gate C of FIG. 3 may be used according to the teachings of U.S. Pat. No. 4,317,993 to correct the inelastic spectra detected in gate A for capture background gamma rays. According to U.S. Pat. No. 4,317,993 issued in the names of Russel C. Hertzog and William B. Nelligan and assigned to the assignee of this invention and application, a gate similar to that of gate C of FIG. 3 is used to detect gamma ray spectra produced by thermal neutron capture from the preceding neutron burst. Such spectra are used to provide standard background spectra, one for the near detector, the other for the far detector, for use in the Moran analysis of the inelastic scattering gamma ray spectrum, as described below. Alternatively the detected capture gamma ray spectra may first be pre-analyzed, by comparison with composite spectra of constituents postulated to have contributed to the detected capture spectra, to determine which constituents have contributed significantly to the capture spectrum. The standard spectra for such significant capture gamma ray contributing constituents may then be used as standard background spectra for analysis of the inelastic scattering gamma ray spectrum. U.S. Pat. No. 4,317,993 is incorporated herein for the disclosure of correcting inelastic spectra with gamma ray spectra derived from gates such as gate C of FIG. 3.

The standard spectra illustrated by example in respective FIGS. 5A and 5B are determined in the laboratory, with an actual tool to be used under field conditions, but in a test borehole of known characteristics. Certain parameters may be varied: e.g., the lithology of the formation may be varied by making the test formation of sandstone (largely silicon dioxide) or limestone (largely calcium carbonate). The porosity of the formation may be varied as well as borehole size, casing size and weight. By testing such test boreholes under laboratory conditions, the measured standards for the near (FIG. 5A) and far (FIG. 5B) detectors may be developed and stored as tables in the memory of computer 31. Accordingly, computer 31 has stored in its memory a plurality of standard spectra: $f_{in}(E)$, representative of near detector and $f_{if}(E)$ representative of far detector. The "i" subscript refers to the "i"th measured standard spectra stored in memory of computer 31. The "n" subscript refers to the near detector spectra; the "f" subscript refers to the far detector spectra. Each spectra set is selected for analysis with measured count rate spectra, to match what is known about the well being logged in the field.

Using the methods of the Moran U.S. Pat. No. 3,521,064, the relative amounts of carbon and oxygen as measured from the near detector $C_n$, $O_n$ and the relative amounts of carbon and oxygen as measured from the far detector $C_f$, $O_f$ are obtained. The Moran patent is incorporated herein for the method. Following the Moran method, a least squares analysis is performed to determine $C_n$, $O_n$ from $g(E)_n$ data and $f_{in}(E)$ standards. $C_f$ and $O_f$ are determined from $g(E)_f$ data and $f_{if}(E)$ standards. The analysis is performed at each logging depth of logging sonde 16 in borehole 12.

Next, the carbon and oxygen determinations of the near and far detectors are combined to determine oil saturation of the formation. This is done by assuming that the total carbon and oxygen measured as indicated above are equal to the sum of the carbon and oxygen yields from the rock matrix of the formation, the pore space fluid, and the borehole fluid:

$$C_{meas} = C_{mat} + C_{por} + C_{bh} \quad (1)$$

$$O_{meas} = O_{mat} + O_{por} + O_{bh} \quad (2)$$

The subscripts of equations (1) and (2) stand for measured, matrix, pore space, and borehole. Equations (1) and (2) may be expressed as a function of $S_o$ (oil saturation in the formation, or % of oil in the pore space) and $C_b$ (the % of oil in the borehole):

$$C_{meas} = \alpha + \beta S_o + \delta C_b \quad (3)$$

$$O_{meas} = \eta + \mu S_o + \nu C_b \quad (4)$$

The coefficients $\alpha$, $\beta$, $\epsilon$, $\eta$, $\mu$, and $\nu$ can be determined under laboratory conditions by taking four measurements under the same conditions except varying $S_o$ and $C_b$. For example, the conditions of a 10 inch (about 25.4 centimeters) borehole, a 7" (about 17.8 centimeters)—23 lb (about 4.17 kilograms) casing in a 33 p.u. sandstone formation may be established, p.u. standing for porosity unit, giving the percentage in volume of the formation filled with fluid (air, gas or liquid). The C and O from near and far detectors may be measured with the logging tool to be used in the field. The table below illustrates the measurements:

| | BOREHOLE | FORMATION | MEASURE |
|---|---|---|---|
| CONDITIONS: | water | water | $C_{meas\,near}$, $O_{meas,\,near}$ $C_{meas\,far}$, $O_{meas,\,far}$ |
| | water | oil | $C_{meas\,near}$, $O_{meas,\,near}$ $C_{meas\,far}$, $O_{meas,\,far}$ |
| | oil | water | $C_{meas\,near}$, $O_{meas,\,near}$ $C_{meas\,far}$, $O_{meas,\,far}$ |
| | oil | oil | $C_{meas\,near}$, $O_{meas,\,near}$ $C_{meas\,far}$, $O_{meas,\,far}$ |

These four measurements with three unknowns are for near and far carbon and oxygen. Since the equations (3) and (4) are over determined, the coefficients $\alpha$, $\beta$, $\delta$, $\eta$, $\mu$, and $\nu$ for both the near and far measurements are solved using conventional least squares procedures.

Next, a carbon/oxygen ratio is formed for each of the near and far detectors:

$$\frac{C_{meas\,n}}{O_{meas\,n}} = COR_n = \frac{\alpha_n + \beta_n S_o + \delta_n C_b}{\eta_n + \mu_n S_o + \nu_n C_b} \quad (5)$$

$$\frac{C_{meas\,f}}{O_{meas\,n}} = COR_f = \frac{\alpha_f + \beta_n S_o + \delta_f C_b}{\eta_f + \mu_f S_o + \nu_f C_b} \quad (6)$$

After $C_{meas\,n}$, $O_{meas\,n}$, $C_{meas\,f}$, and $O_{meas\,f}$ and the $\alpha$, $\beta$, $\delta$, $\eta$, $\mu$, and $\nu$ coefficients are stored in tables in computer 31, equations (5) and (6) are used to solve for $S_o$ and $C_b$:

$$S_o = \frac{(\alpha_f - COR_f \eta_f)(COR_n \nu_n - \delta_n) +}{(\beta_n - COR_n \mu_n)(COR_f \nu_f - \delta_f) +} \\ \frac{(\alpha_n - COR_n \eta_n)(\delta_f - COR_f \nu_f)}{(\beta_f - COR_f \mu_f)(\delta_n - COR_n \nu_n)} \quad (7)$$

$$C_b = \frac{(\alpha_f - COR_f \eta_f)(COR_n \mu_n - \beta_n) +}{(\beta_n - COR_n \mu_n)(COR_f \nu_f - \delta_f) +} \\ \frac{(\alpha_n - COR_n \eta_n)(\beta_f - COR_f \mu_f)}{(\beta_f - COR_f \mu_f)(\delta_n - COR_n \nu_n)} \quad (8)$$

Figure 6:
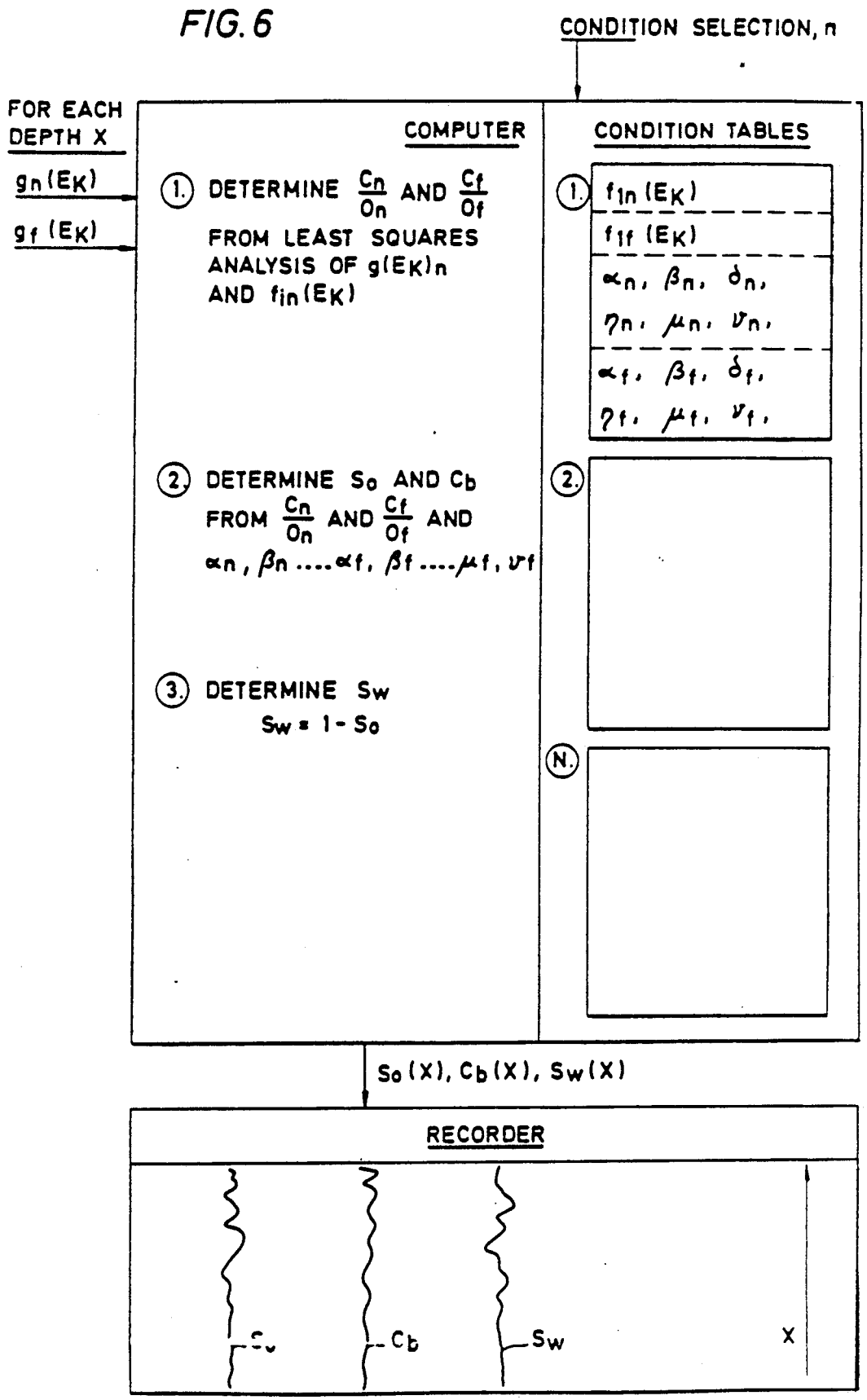
FIG. 6 is a functional block diagram illustrating the method of the invention.

At each depth in the borehole, a signal representative of oil saturation $S_o$, and water saturation $S_w = 1 - S_o$, and percentage oil in the borehole $C_b$, is recorded on recorder 32 as illustrated in FIGS. 1 and 6. FIG. 6 illustrates the processing steps described above where the computer 31 is input at each depth with the inelastic spectra data for near and far detectors $g_n(E_k)$, $g_f(E_k)$, where the $E_k$ represents the pulse height of energy at the kth window. The computer is input with condition selections such that one of n condition tables are selected. Each condition table includes standard spectra and $\alpha$, $\beta$, $\delta$, $\eta$, $\mu$, and $\nu$ parameters predetermined for the measurement tool with knowledge about borehole size, casing weight, formation porosity, etc. Once the condition table has been determined, the steps as described above and outlined in FIG. 6 are performed to produce signals $S_o(x)$, $C_b(x)$ and $S_w(x)$.

Determination of Formation and/or Borehole Capture Decay Time Constant $\tau$

The apparatus of FIGS. 1 and 2 may be used, with a change in the repetition cycle as described above, to determine from capture gamma ray count rates of gates similar to capture gates B and C of FIG. 3, the formation and borehole capture decay time constant $\tau$ and the correlative $\Sigma$. The preferred method of measuring formation $\tau$ and borehole $\tau$ is described in issued U.S. Pat. No. 4,721,853 to P. Wraight which is assigned to the assignee of this application. Such patent is incorporated by reference for such measurement technique. In other words, the apparatus of FIGS. 1 and 2, with programming changes of computer 31, may also be used to determine formation $\tau$ and borehole $\tau$ on a subsequent logging trip into the borehole, thereby eliminating the cost of providing a separate tool for such measurement.

Block Diagram Description of Downhole Components and Electronic Circuits

Figure 7:
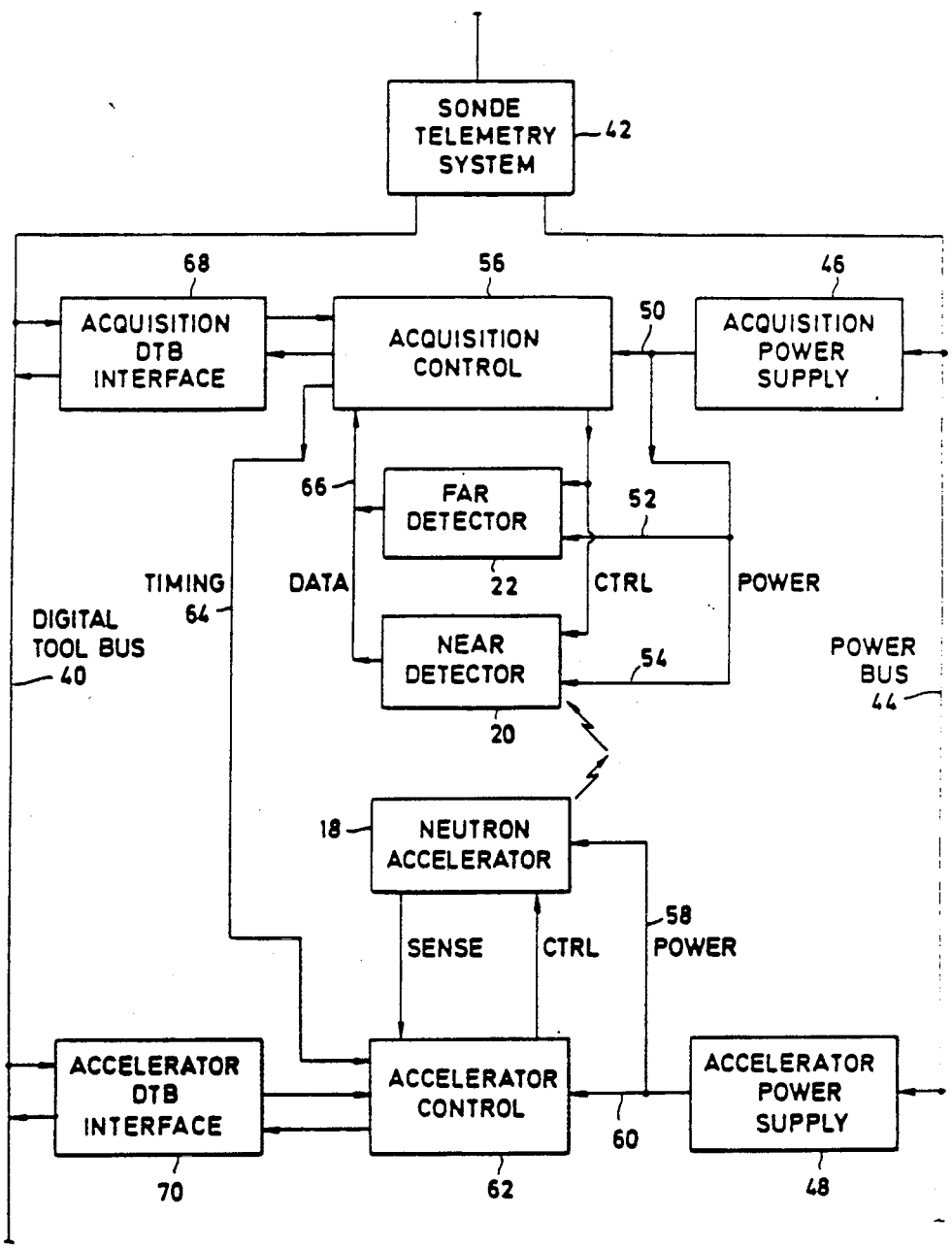
FIG. 7 is a functional block diagram illustrating the control and data collection electronics for the downhole accelerator and near and far detectors.

FIG. 7 illustrates a block diagram of the circuits used to power and control the neutron accelerator 18, to power and control acquisition of gamma ray count data from near and far detectors 20 and 22, and to telemeter data back and forth to surface instrumentation 30 (FIG. 1). A sonde telemetry system 42 provides two way digital timing control and data signals via cable 26 to surface telemetry unit 28. Power to the sonde is also provided via cable 26 to sonde telemetry system 42. Digital tool bus 40 carries control and data signals, while power bus 44 carries electrical power to acquisition power supply 46 and to accelerator power supply 48. Busses 50, 52 and 54 provide power to acquisition control electronics 56, far detector 22 and near detector 20. Busses 58 and 60 provide power to neutron accelerator 18 and accelerator control 62. The timing of accelerator control 62 is controlled via line 64 from acquisition control 56 to accelerator control 62.

Gamma ray count data from near detector 20 and far detector 22 is applied to acquisition control electronics 56 via data bus 66. An interface circuit 68 provides two way data transmission between digital tool bus 40 and acquisition control 56. An interface circuit 70 provides two way data transmission between digital tool bus 40 and accelerator control circuit 62.

Description of Accelerator and Detectors

The preferred neutron accelerator or pulsed neutron source 18 is adapted to generate discrete pulses of fast neutrons, e.g., 14 MeV, and suitably may be of the types described in more complete detail in U.S. Pat. No. 2,991,364 issued July 4, 1961 to C. Goodman and U.S. Pat. No. 3,508,058 issued Apr. 20, 1970 and U.S. Pat. No. 3,775,216 issued Nov. 27, 1973, both to A. H. Frentrop. These three patents are incorporated by reference.

The near and far detectors 20 and 22 each preferably comprise an assembly of a scintillation crystal optically coupled to a photomultiplier tube. The preferred crystal for the detectors used with this invention are made of GSO, a shorthand name for the material, gadolinium orthosilicate doped with cerium. Such a crystal provides advantageous operating characteristics, including relatively high detection efficiency and energy resolution and the ability to operate in a borehole environment without special protection against contamination or temperature effects. Such crystal is described in detail in U.S. Pat. No. 4,883,956 to Schwertzer et al. assigned to the assignee of this application and incorporated herein.

The phototube to be used with the near and far detector assemblies may be commercially available tubes sold by such companies as EMR, Inc. and RCA. The RCA 8575 phototube is preferred for the 2½" (about 6.35 centimeters) configuration of the sonde 10, as illustrated in FIG. 10. The EMR 741N phototube is preferred for the 1 11/16" (about 4.3 centimeters) configuration of the sonde 14.

Description of Source-Detector Shielding Arrangements

As described above with respect to the method of the invention, it is important to correct for inelastic gamma rays emanating from the borehole when seeking a precise measurement of formation $S_o$. This is especially so when the oil-water ratio of the well bore fluids is not known with precision when a producing well is to be logged and it is important to not shut it in, or stop production.

Figure 8:
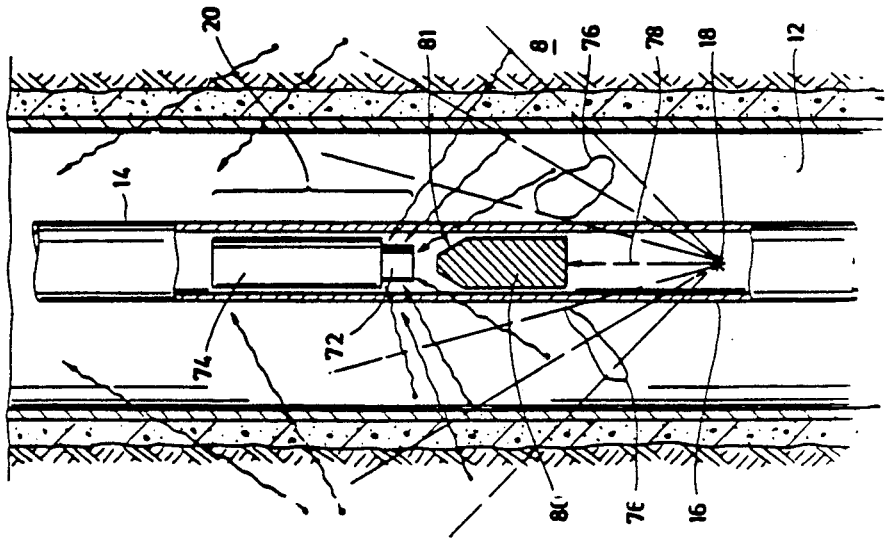
FIG. 8 illustrates a shielding arrangement by which a near detector of a small diameter tool may be made more sensitive to borehole generated gamma rays.

Therefore this invention, as described above, provides two detectors, both for measuring carbon-oxygen levels. The near detector, due to its proximity to the accelerator, is more sensitive to carbon generated inelastic gamma rays from hydrocarbon molecules in the borehole. FIG. 8 depicts the geometry of the neutron accelerator 18 and near detector 20 including a scintillating crystal 72 and photomultiplier tube 74. Neutrons produced by accelerator 18 pass through fluids in the well bore 12 and into the formation 8. Relatively more inelastic gamma rays from carbon and oxygen atoms generated in the borehole reach the near scintillation crystal 72 due to the cylindrical geometry of the well bore and the shielding 80 placed between accelerator 18 and near crystal 72. Conversely, relatively more inelastic gamma rays from carbon and oxygen atoms generated in the formation reach the far scintillation crystal (not shown in FIG. 8). These facts form the basis for the two detector method of determining formation $S_o$ and borehole $C_b$ as described above where near and far determinations of carbon and oxygen are combined to determine $S_o$ corrected for borehole carbon and oxygen atoms and $C_b$ corrected for formation carbon and oxygen atoms.

Consequently it is desirable to provide shielding geometries by which the near detector may be made more sensitive to inelastic carbon-oxygen generated gamma rays from the borehole. FIG. 8 shows a single shield 80 placed between accelerator 18 and scintillation crystal 72 for making the near detector 20 relatively more sensitive to borehole carbon - oxygen inelastic gamma rays. The shield 80 of FIG. 8 is especially suited for a 1 11/16" (about 4.3 centimeters) tool because there is not sufficient space for backshielding arrangements (described below) for the near detector 20 and far detector 22 given the constraints of the size of photomultiplier tubes 74. The shield of FIG. 8 is a cylindrical block having a conical shape facing crystal 72. Said shield is preferably made of an alloy of tungsten sold under the tradename Hevimet. The conical shape of the end 81 of shield 80 allows relatively more borehole gamma rays to reach the crystal 72 than if the end 81 were simply flat at its top.

It is important that shield 80 be axially thick enough to prevent neutrons such as that depicted at 78 to be stopped from direct passage to crystal 72. In that regard, the shield should be placed as close as possible to the lower end of crystal 72. For example it has been found that placing the top end 81 within ¾" (about 1.9 centimeters) of the lower end of crystal 72 is advantageous. The diameter of the cylindrical portion of shield 80 should be as large as possible to shield as many gamma rays as possible. Advantageously, the diameter of shield 80 should entirely fill the inside diameter of the housing sleeve 16. The axial length of shield 80 should be about seven inches to kill through tool neutrons, such as 78, before they reach the detector 20.

Figure 9A:
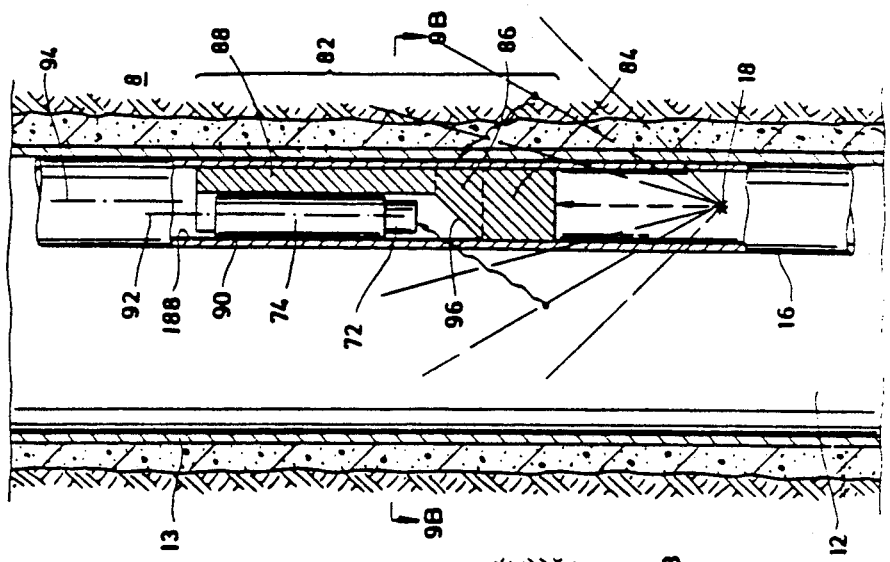
FIGS. 9A and 9B illustrate a backshielding arrangement in cross-sectional views by which a near detector for a larger diameter tool may be made more sensitive to borehole produced gamma rays.
Figure 9B:
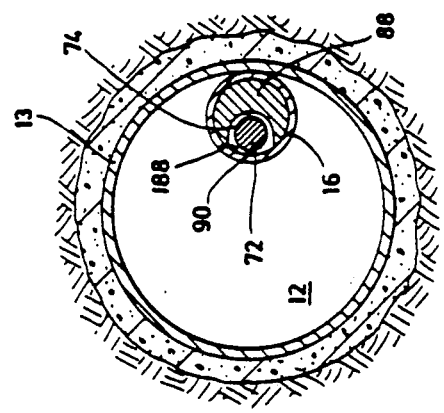

The 11/16" about 4.3 centimeters diameter sonde 16 of FIG. 8 may be used in production tubing 14. Larger tools, for example 2½" (about 6.35 centimeters) in diameter, while not applicable for use in through tubing applications, may be forced against the steel casing wall by an eccentering device such as illustrated as a bow spring 36 of FIG. 2. Consequently, backshielding arrangements are advantageous to make the near detector more sensitive to borehole gamma rays and less sensitive to formation gamma rays. FIGS. 9A and 9B illustrate one such arrangement.

The housing sleeve 16 is forced against a wall of casing 13 of the well bore 12. The crystal 72–phototube 74 assembly is mounted above accelerator 18 with its longitudinal axis parallel to but offset from housing sleeve longitudinal axis 94. A longitudinal edge 90 of phototube 74, which preferably has an outside diameter less than the inside diameter of the housing sleeve, is immediately adjacent an inside longitudinal edge 188 of housing sleeve 16. The remaining space between the outside of the phototube 90 and the inside of the housing sleeve 16, called the backspace, is filled with shielding material, such as hevimet. Such shielding, designated by reference numeral 88, serves to shield the phototube 74 and crystal from gamma rays from the formation 8. The backshield 88 is preferably integral with lower shield portion 84 and transition shield portion 86. The integral shield preferably constructed of heviment material including backshield portion 88, transition portion 86, and lower shield portion 84 is designated by reference numeral 82. The lower shield portion 84 serves a similar function as the main body of shield 80 of FIG. 8. It shields detector 72 and phototube 74 from direct neutrons from accelerator 18. The intermediate portion 86 has a borehole facing surface 96 upwardly sloping from lower shield portion 84 to backshield portion 88 and serves to allow a greater number of gamma rays produced in the well bore 12 to reach crystal 72. Consequently, the shield 82 serves to maximize the sensitivity of crystal 72 to gamma rays emanating from the well bore while simultaneously minimizing its sensitivity to gamma rays emanating from the formation.

Figure 10A:
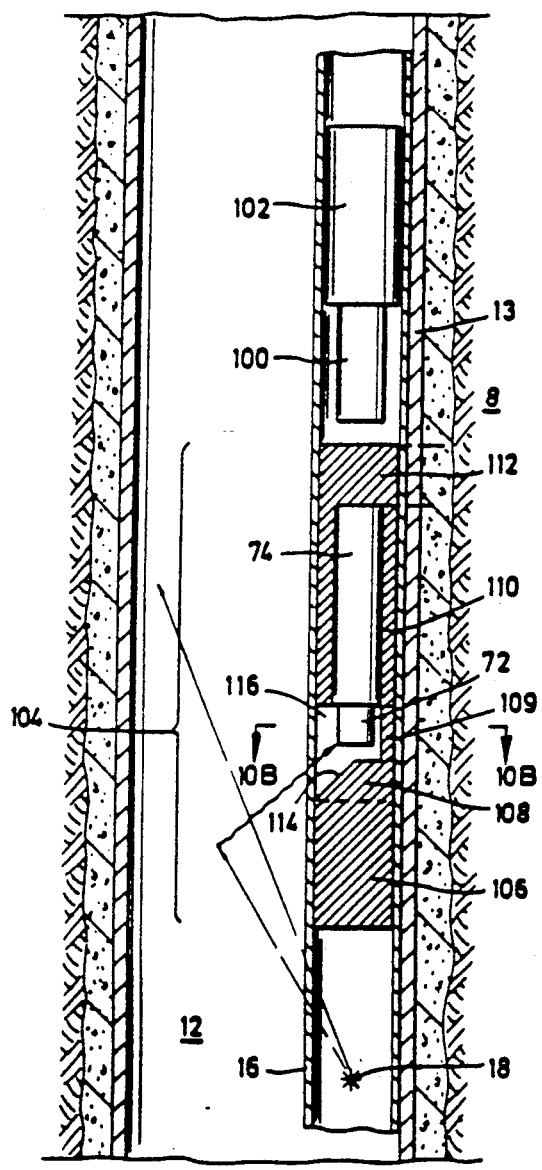
FIGS. 10A and 10B illustrate an alternative backshielding arrangement in cross-sectional views by which a near detector for a larger diameter tool may be backshielded from formation gamma rays while simultaneously increasing its sensitivity to borehole gamma rays.
Figure 10B:
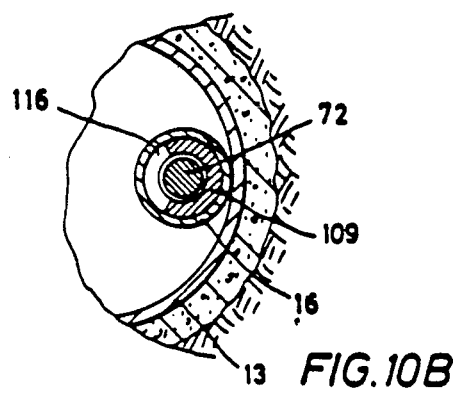

FIG. 10A is an alternative arrangement for backshielding the near detector comprising crystal 72 and phototube 74. The arrangement of FIG. 10A, especially adapted for a 2½" about 6.35 centimeters tool with eccentring means (not shown), has the near detector crystal 72 and phototube mounted coaxially within housing sleeve 16. The far detector including crystal 100 and phototube 102 are coaxially mounted a greater distance from accelerator 18 than is the near detector. Shield 104 includes a backshield portion 110 which substantially completely fills the space between the outside diameter of phototube 74 and the inside diameter of housing sleeve 16. A lower shield portion 106 shields crystal 72 from direct neutrons from accelerator 18. A first intermediate shield portion 108 is integral with lower shield portion 106 and has a sloping face 114 which faces the borehole 12. A second intermediate portion 109 is integral with first intermediate portion 108 and backshield portion 110. FIG. 10B, a downward cross-sectional view through lines 10B-10B illustrates that it has a substantial arc of shielding material 109 facing the wall of casing 13 and the formation 8 and has an angular notch 116 facing the borehole 12. A top cap portion 112 is disposed atop backshield portion 110.

In the arrangement of FIG. 10A, the near detector is made more sensitive to gamma ray production inside the well bore 12 by virtue of the sloping face 114 and the notch 116 of their respective shield portions of shield 104 and less sensitive to formation gamma rays by virtue of backshield portions 109 and 110. The far detector crystal 100 is more sensitive to formation gamma rays because of its proximity to the wall of casing 13 and is less sensitive to well bore gamma rays by virtue of this greater distance from accelerator 18.

Figure 11:
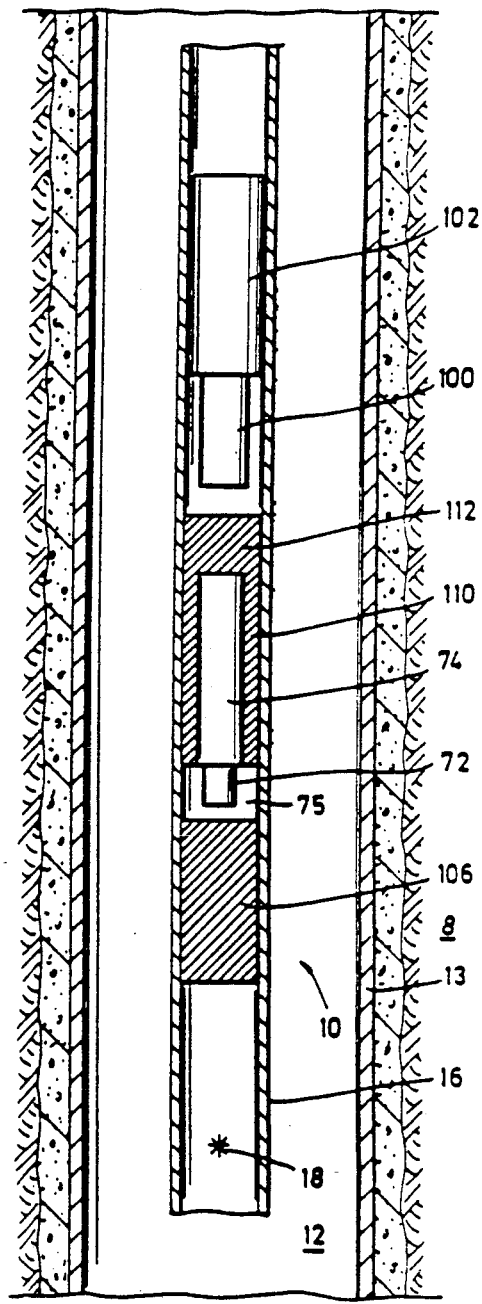
FIG. 11 illustrates another alternative shielding arrangement in a cross-sectional view by which a near detector for a larger diameter tool may be symmetrically end shielded.

FIG. 11 illustrates an alternative shielding arrangement similar to that of FIG. 10A but includes a cylindrical gap 75 between lower shield portion 106 and backshield portion 110 and top cap portion 112. The sonde of FIG. 11 would be advantageously used where the housing sleeve 16 of the sonde is centered within well bore 12.

Figure 12A:
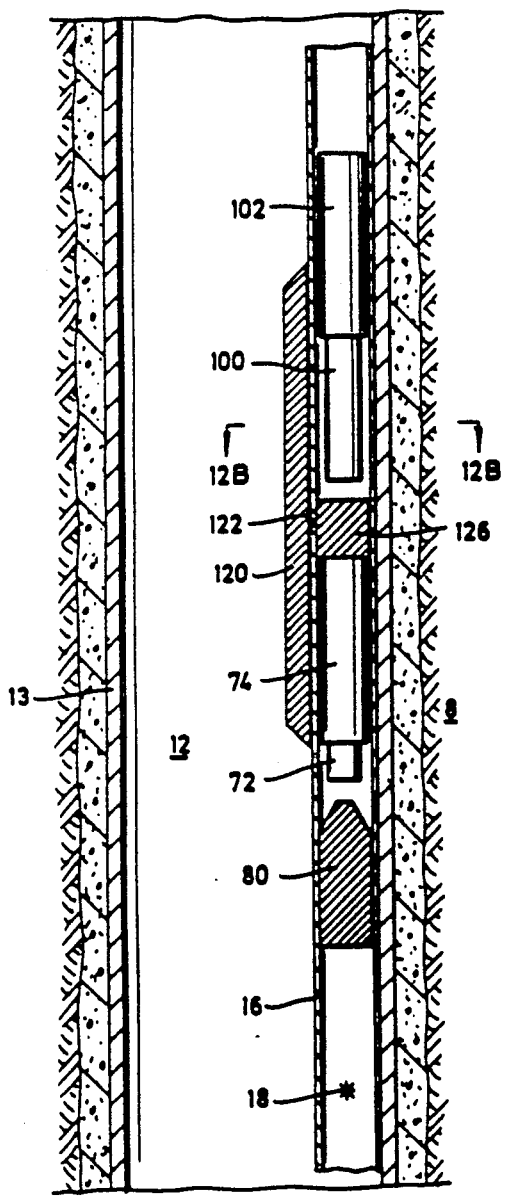
FIGS. 12A and 12B illustrate an alternative backshielding arrangement in cross-sectional views by which a small diameter tool may be fitted with an external sleeve for backshielding a far detector from borehole gamma rays while allowing reception of formation gamma rays.
Figure 12B:
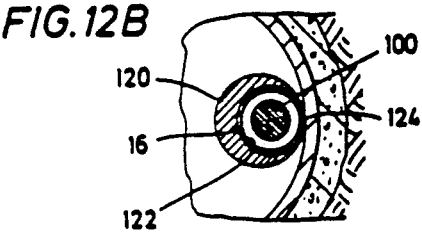

FIGS. 12A and 12B illustrate another backshielding arrangement by which the 1 11/16" (about 4.3 centimeters) sonde of FIG. 8 may be used, not in a centered well application, but eccentered in well bore 12. A backshielding sleeve 120 is placed surrounding a longitudinal portion of housing sleeve 16 as seen more clearly in FIG. 12B which is a downward cross-sectional view along lines 12B-12B of FIG. 12A. Sleeve 120 is formed of a cylindrically shaped shielding material such as hevimet with a longitudinal bore 122 formed in it parallel to the longitudinal axis of the shield. The housing sleeve 16 is then placed within the bore 122 such that a longitudinal edge (the top portion of which is depicted by reference numeral 124 in FIG. 12B) faces the wall of casing 13 adjacent formation 8. The longitudinal extent of sleeve 120 extends from the lower portion of near phototube 74, past far crystal 100 to a point approximately midway of upper phototube 102. A cylindrical shield 126 of hevimet is placed above phototube 74 and below far crystal 100. The backshield 120 functions to make the upper crystal less sensitive to well bore inelastic gamma rays, while shield 80, as explained above with respect to FIG. 8, makes the near crystal 72 more sensitive to well bore inelastic gamma rays.

Figure 13A:
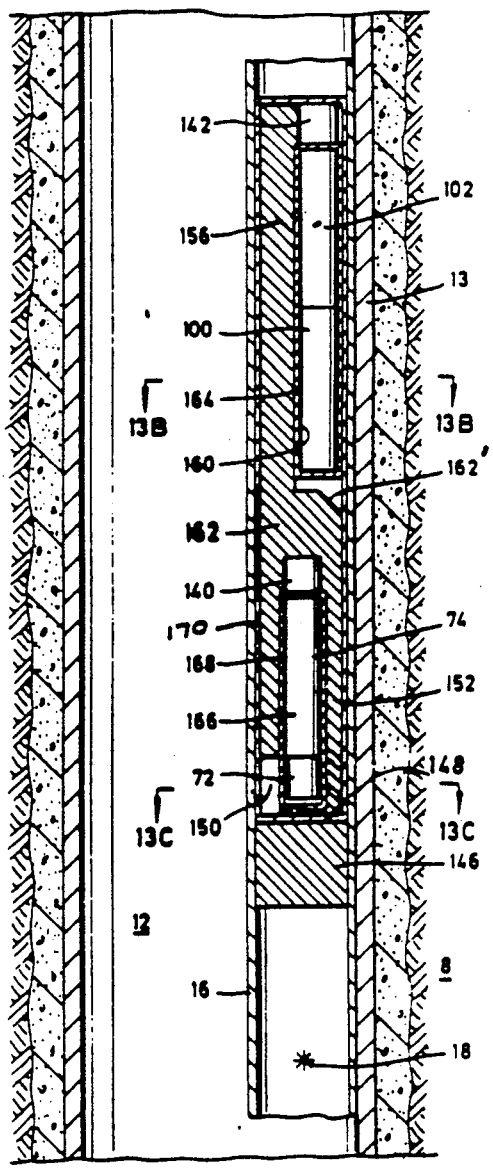
FIGS. 13A, 13B and 13C illustrate another alternative shielding arrangement in which both the near detector and far detector are backshielded in oppositely facing direction.
Figure 13B:
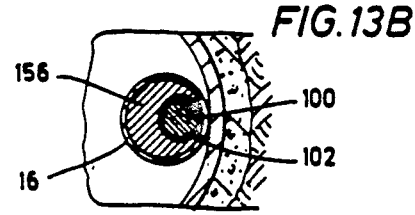
Figure 13C:
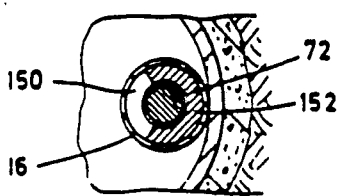

FIGS. 13A, 13B, and 13C illustrate an alternative shielding arrangement where both the near detector (crystal 72, phototube 74) and far detector (crystal 100, phototube 102) are backshielded. FIG. 13A also shows placement of preamplifier circuits 140, 142 above near phototube 74 and far phototube 102. The backshield of the near crystal 72 and phototube 74 is similar in design to that of FIGS. 10A and 10B with the exception that the top part 148 of lower shield portion 146 perpendicularly faces the bottom of crystal 72. The intermediate portion 152 of the shield has a notch 150 removed from it in an arc facing the borehole 12. The intermediate portion 152 is similar in construction to backshield portion 110 of FIG. 10A.

Backshield portion 156 surrounding far crystal 100 and far phototube 102 is formed from cylindrical stock of a shielding material, preferably hevimet, which has a bore 160 formed in it having an axis offset from that of housing sleeve 16 in which it is placed. The axis of bore 160 is disposed substantially 180° from the direction which notch segment 150 of shield portion 152 faces. Phototube 102 and crystal 100 are placed in bore 160 such that the crystal 100 is adjacent the well bore wall 13 and receives formation gamma rays with no shielding. On the borehole side of the far crystal 100, the shield substantially prevents borehole gamma rays from striking the crystal 100. The intermediate portion 162 of the shield below far crystal 100 has a slope 162' which slopes upwardly from bottom to top so as to further facilitate the reception of formation gamma rays to far crystal 100.

Consequently, the shielding arrangements of FIG. 13A provide enhanced sensitivity of near crystal 72 to well bore inelastic gamma rays while abating its sensitivity to formation inelastic gamma rays. It also enhances the sensitivity of far crystal 100 to borehole inelastic gamma rays while abating the sensitivity to borehole inelastic gamma rays.

The steel casing 13 which lines well bore 12 may become magnetized before or during the completion of a well. The phototubes as illustrated in FIGS. 8-13 may be adversely affected by magnetic fields of the casing through which sonde 16 is moved. Therefore, the FIG. 13A tool may further include magnetic shields 164 and 168 (not shown in FIGS. 13B and 13C) to protect phototube 102 and 74 from casing induced magnetic fields. Internal shields 164 and 168 are preferably fabricated of a material which has high magnetic permeability such as AD-MU-80 available from Advance Magnetics Inc. of Rochester, Ind., U.S.A. Shields 164 and 168 are essentially metallic cylinders, closed at top and bottom ends, which surround respectively phototube 102/crystal 100 and phototube 74/crystal 72. External shield 170, preferably fabricated of a material having high magnetic saturation, such as mild steel, is placed within sonde housing 16 to envelope the internally shielded phototube 102/crystal 100 at phototube 74/crystal 72. Shield 170 is a metallic cylinder, closed at top and bottom ends. Shields 168, 164 and 170 provide magnetic isolation from the borehole environment, yet are essentially transparent to gamma rays.

In a further refinement of the present invention, the phototube 72, 102 and crystal 72, 100 of the respective near and far detectors are wrapped in a Boron shield (not shown) to reduce thermal and epithermal neutron interactions in the crystal, and therefore reduce noise and improve signal-to-noise ratio. Preferably the shield is made of a ribbon of synthetic resin polymer, sold under the trademark TEFLON, impregnated with boron and wrapped around the phototube 74, 102 and the crystal 72, 100 respectively. The wrapping for the crystal may, advantageously be impregnated with enriched boron, i.e., boron$_{10}$. A lead sheet or ribbon may be wrapped around the crystal of the near detector to discriminate against gamma rays with low energy threshold to further improve the signal-to-noise ratio of the detector output in the energy range of interest. For clarity of illustration, the lead sheet is not shown in the Figures.

Various improvements and modifications to the above embodiments are within the scope of the present invention, which scope is defined in the appended claims only.

What is claimed is:

1. A method for determining the hydrocarbon saturation $S_o$ of an earth formation surrounding a borehole, comprising the steps of:
   emitting fast neutrons into said formation from a neutron source in said borehole,
   detecting gamma rays resulting from the interaction between said neutrons and materials from said borehole and said formation;
   forming gamma ray spectrum signals from said gamma rays and deriving from said signals the carbon yield and oxygen yield;
   expressing said carbon yield as a first linear function of $S_o$ and of the oil percentage in the borehole ($C_b$), and expressing said oxygen yield as a second linear function of $S_o$ and of $C_b$; and
   deriving $S_o$ from said first and second linear functions.

2. The method according to claim 1 wherein said first function is of the following form:

$$C = \alpha + \beta S_o + \delta C_b$$

and said second function is of the form:

$$O = \eta + \mu S_o + \nu C_b$$

where "$\alpha$, $\beta$, $\delta$, $\eta$, $\mu$ and $\nu$" are coefficients representative of the environmental effects.

3. The method according to claim 2 further comprising the step of determining said coefficients "$\alpha$, $\beta$, $\delta$, $\eta$, $\mu$ and $\nu$" under laboratory conditions by carrying out four measurements under the same conditions, except varying $S_o$ and $C_b$ by using different liquid (water or oil) for respectively said borehole and said formation.

4. The method according to claim 1 wherein the detection step is carried out at two locations longitudinally spaced from said neutron source.

5. An apparatus for determining the hydrocarbon saturation $S_o$ of an earth formation surrounding a borehole, comprising:
   a fast neutron source,
   means for detecting gamma rays resulting from the interaction between said neutrons and materials from said borehole and said formation;
   means for forming gamma ray spectrum signals from said gamma rays and deriving from said signals the carbon yield and oxygen yield;
   means for expressing said carbon yield as a first linear function of $S_o$ and of the oil percentage in the borehole $C_b$, and expressing said oxygen yield as a second linear function of $S_o$ and of $C_b$; and
   means for deriving $S_o$ from said first and second linear functions.

6. The apparatus according to claim 5 wherein said first function is of the following form:

$$C = \alpha + \beta S_o + \delta C_b$$

and said second function is of the form:

$$O = \eta + \mu S_o + \nu C_b$$

where "$\alpha$, $\beta$, $\delta$, $\eta$, $\mu$ and $\nu$" are coefficients representative of the environmental effects.

7. The method according to claim 6 further comprising means for determining said coefficients "$\alpha$, $\beta$, $\delta$, $\eta$, $\mu$ and $\nu$" under laboratory conditions, including means for carrying out four measurements under the same conditions, except varying $S_o$ and $C_b$ by using different liquid (water or oil) for respectively said borehole and said formation.

8. The apparatus according to claim 5 comprising two detecting means longitudinally spaced from said neutron source.

* * * * *